(12) United States Patent
Maekawa et al.

(10) Patent No.: US 9,309,402 B2
(45) Date of Patent: *Apr. 12, 2016

(54) BIODEGRADABLE RESIN COMPOSITION AND MOLDED ARTICLE OF THE SAME

(75) Inventors: Shintaro Maekawa, Ichihara (JP); Shinichi Usugi, Chiba (JP); Hitoshi Onishi, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/006,467

(22) PCT Filed: Mar. 30, 2012

(86) PCT No.: PCT/JP2012/058562
§ 371 (c)(1),
(2), (4) Date: Sep. 20, 2013

(87) PCT Pub. No.: WO2012/137681
PCT Pub. Date: Oct. 11, 2012

(65) Prior Publication Data
US 2014/0011965 A1    Jan. 9, 2014

(30) Foreign Application Priority Data
Apr. 1, 2011 (JP) ................ 2011-082160

(51) Int. Cl.
| | |
|---|---|
| *C08L 63/00* | (2006.01) |
| *C08L 67/00* | (2006.01) |
| *C08L 101/00* | (2006.01) |
| *C08L 67/04* | (2006.01) |
| *C08L 101/16* | (2006.01) |

(52) U.S. Cl.
CPC .............. *C08L 67/04* (2013.01); *C08L 67/00* (2013.01); *C08L 101/16* (2013.01)

(58) Field of Classification Search
None
See application file for complete search history.

(56) References Cited

U.S. PATENT DOCUMENTS

| | | | |
|---|---|---|---|
| 6,372,844 B1 | 4/2002 | Shinoda et al. | |
| 2004/0023987 A1* | 2/2004 | Hata et al. | 514/260.1 |
| 2004/0224123 A1 | 11/2004 | Yano et al. | |

FOREIGN PATENT DOCUMENTS

| | | | |
|---|---|---|---|
| EP | 1291023 A1 | | 3/2003 |
| JP | 2000-345033 A | | 12/2000 |
| JP | 2004-196906 A | | 7/2004 |
| JP | 2004-300389 A | | 10/2004 |
| JP | 2005-036179 | * | 2/2005 |
| JP | 2005-036179 A | | 2/2005 |
| JP | 2006-299133 A | | 11/2006 |
| JP | 2007-091769 A | | 4/2007 |
| JP | 2008-050565 A | | 3/2008 |
| JP | 2010-116481 A | | 5/2010 |

OTHER PUBLICATIONS

L.V. Labrecque et al., Citrate Esters as Plasticizers for Poly(lactic acid), Journal of Applied Polymer Science, 1997, vol. 66, pp. 1507-1513, John Wiley & Sons, Inc., University of Massachusetts Lowell, Lowell Massachusetts.
International Search Report (PCT/ISA/210) mailed on Jun. 5, 2012, by the Japanese Patent Office as the International Searching Authority for International Application No. PCT/JP2012/058562.
Written Opinion (PCT/ISA/237) mailed on Jun. 5, 2012, by the Japanese Patent Office as the International Searching Authority for International Application No. PCT/JP2012/058562.
Extended Search Report issued in corresponding European Application No. 12767384 on Apr. 1, 2015 (5 pages).

* cited by examiner

*Primary Examiner* — Ana Woodward
(74) *Attorney, Agent, or Firm* — Buchanan, Ingersoll & Rooney PC

(57) ABSTRACT

Disclosed are a biodegradable resin composition comprising a copolymer (A) with a weight average molecular weight of 1,000 to 30,000, which comprises a constituent unit (a-1) derived from a multivalent carboxylic acid except for an amino acid and a constituent unit (a-2) derived from a hydroxycarboxylic acid, and a biodegradable resin (B), which has excellent hydrolyzability and excellent transparency; and a biodegradable molded article composed of this biodegradable resin composition.

8 Claims, 1 Drawing Sheet

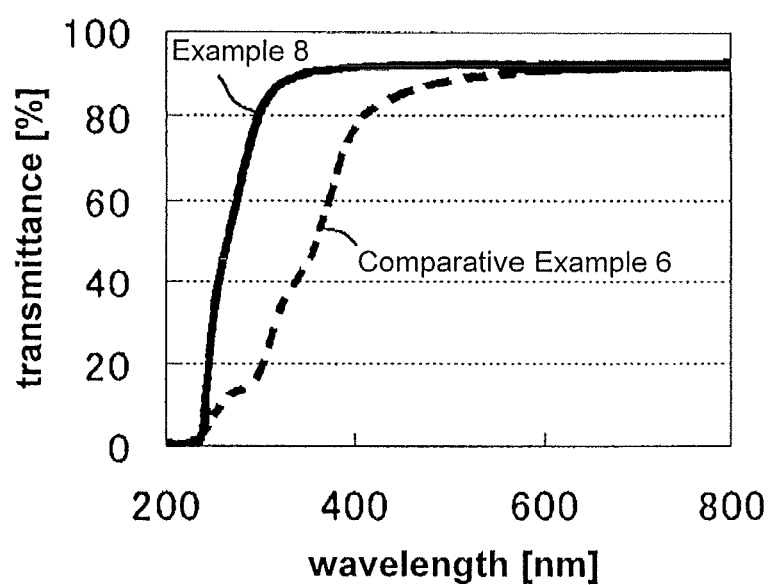

BIODEGRADABLE RESIN COMPOSITION AND MOLDED ARTICLE OF THE SAME

TECHNICAL FIELD

The present invention relates to a biodegradable resin composition which has excellent hydrolyzability and transparency, and a biodegradable molded article consisting of this resin composition. For further detail, it relates to a biodegradable resin composition containing a copolymer which has a function to promote hydrolyzability and has good dispersibility to a biodegradable resin, and a biodegradable molded article.

BACKGROUND ART

In recent years, with global environment getting worse, much attention is increasingly paid to recycling of resins and to additives which are safe for living bodies and less harmful to global environment. Resins represented by polylactic acids (PLA), polyglycolic acids (PGA), polycaprolactones (PCL), and the like are utilized as biodegradable resins which can be degraded by water or an enzyme under a natural environment or in a living body.

For example, since the PLA has good processability and the molded article has excellent mechanical strength, it is utilized as disposable containers, packages, and the like. However, since the PLA has relatively slow degradation speed under a condition other than in compost (for example: in sea water, soil, or the like), it can scarcely be used for a purpose in which it is required to degrade and vanish the PLA within several months. Also, in the case of using a PLA for a slow-release medicine, the PLA has slow degradation speed in a living body, and it remains in the living body for a long time after the agent has been released. Thus, it cannot sufficiently respond to the needs of medicines in which the agent is slowly released within a relatively short period.

As a method for improving hydrolysis speed of a PLA to overcome the problem, for example, a method by compounding a hydrophilic additive such as a polyethylene glycol with the PLA is proposed. However, the PLA is less hydrophilic and is hardly compatible to a hydrophilic additive such as a polyethylene glycol. Therefore, the additive bleeds out during molding or after molding, the mechanical strength of the molded article is decreased, and the appearance such as transparency is deteriorated. In consequence, it is not practical.

Also, in order to improve hydrolysis speed of a biodegradable resin such as a PLA, a resin composition, which has a constituent unit derived from aspartic acid or the like and a constituent unit derived from lactic acid or the like as a degradation accelerator with a biodegradable resin such as a PLA, is provided (Patent Document 1). This resin composition shows sufficient hydrolyzability depending on purpose. However, with diversification of the consumer's needs, the needs to a biodegradable resin are sophisticated, and a resin composition having a high degradation speed and higher transparency is required depending on purpose.

Also, it is known to use a malic acid saturated ester compound or a citric acid saturated ester compound as a plasticizer to give flexibility to a polylactic acid (Patent Document 2 and Patent Document 3), and it is also known that, in the case of adding a large amount of a citric acid saturated ester compound, hydrolysis of the polylactic acid occurs (Non-Patent Document 1). However, in the case of using a small amount of such a plasticizer, hydrolyzability is not developed while, in the case of using a large amount of it, the mechanical strength and heat resistance of the molded article are largely decreased. In consequence, it is not practical.

PRIOR ART DOCUMENT

Patent Document

Patent Document 1: JP 2000-345033 A
Patent Document 2: JP 2004-196906 A
Patent Document 3: JP 2004-300389 A Non-Patent Document Non-Patent Document 1: L. V. Labrecque, R. A. Kumar, V. Dave, R. A. Gross, S. P. Mccarthy, "Citrate Esters as Plasticizers for Poly(lacticacid)", (US), John Wiley & Sons. Inc., Journal of Applied Polymer Science, 1997, Vol. 66, p. 1507-1513

SUMMARY OF THE INVENTION

Problem to be Solved by the Invention

The object of the present invention is to provide a biodegradable resin composition which has excellent hydrolyzability and excellent transparency, and a biodegradable molded article consisting of this resin composition.

Means of Solving the Problem

After earnest study, the present inventors have found a biodegradable resin composition containing a copolymer which has a function to promote hydrolyzability and has good dispersibility to a biodegradable resin, and have achieved the present invention.

That is, the present invention is:

[1] A biodegradable resin composition (C), comprising:
a copolymer (A) with a weight average molecular weight of 1,000 to 30,000, which comprises a constituent unit (a-1) derived from a multivalent carboxylic acid except for an amino acid and a constituent unit (a-2) derived from a hydroxycarboxylic acid, and
a biodegradable resin (B).

[2] Above-mentioned biodegradable resin composition (C), wherein the multivalent carboxylic acid is a hydroxydicarboxylic acid and/or a hydroxytricarboxylic acid.

[3] Above-mentioned biodegradable resin composition (C), wherein the multivalent carboxylic acid is malic acid and/or citric acid.

[4] Above-mentioned biodegradable resin composition (C), wherein the biodegradable resin (B) is a polyhydroxycarboxylic acid.

[5] Above-mentioned biodegradable resin composition (C), wherein the biodegradable resin (B) is a polylactic acid.

[6] Above-mentioned biodegradable resin composition (C), wherein the mol composition ratio [(a-1)/(a-2)] of constituent unit (a-1) and constituent unit (a-2) in copolymer (A) is 1/10 to 1/50.

[7] Above-mentioned biodegradable resin composition (C), wherein the mass composition ratio [(A)/(B)] of copolymer (A) and biodegradable resin (B) is 1/99 to 20/80 when the total amount of copolymer (A) and biodegradable resin (B) is 100.

[8] Above-mentioned biodegradable resin composition (C), wherein the weight average molecular weight of copolymer (A) is 2,500 to 20,000.

[9] A biodegradable molded article, composed of the above-mentioned biodegradable resin composition (C).

[10] A film, composed of the above-mentioned biodegradable resin composition (C).

Effect of the Invention

The biodegradable resin composition of the present invention has excellent hydrolyzability. The reason is presumed to be why the copolymer which has a function to promote hydrolyzability and has good compatibility to a biodegradable resin, and thereby it is uniformly finely dispersed in the biodegradable resin and phase separation which may result in preventing hydrolysis does not occur. Also, the biodegradable resin composition of the present invention has excellent transparency. The reason is presumed to be why the copolymer which has a function to promote hydrolyzability does not have an N atom-containing functional group which causes coloration.

BRIEF DESCRIPTION OF DRAWINGS

FIG. 1 is a graph showing the transmittance of a light with a wavelength of 200 to 800 nm in Example 8 and Comparative Example 6.

MODE FOR CARRYING OUT THE INVENTION

<Copolymer (A)>

The copolymer (A) used in the present invention comprises the constituent unit (a-1) derived from a multivalent carboxylic acid except for an amino acid and constituent unit (a-2) derived from a hydroxycarboxylic acid. The copolymer (A) may be any one of a random copolymer, a block copolymer, or a graft copolymer.

The constituent unit (a-1) is not particularly limited as long as it is a constituent unit derived from a multivalent carboxylic acid except for an amino acid. Among these, it is preferably a constituent unit derived from a hydroxydicarboxylic acid and/or a hydroxytricarboxylic acid, and is more preferably a constituent unit derived from malic acid and/or citric acid.

The constituent unit (a-2) is not particularly limited as long as it is a constituent unit derived from a hydroxycarboxylic acid. Among these, it is preferably a constituent unit derived from an α-hydroxycarboxylic acid such as glycolic acid, lactic acid, 2-hydroxybutyric acid, 2-hydroxyvaleric acid, 2-hydroxycaproic acid, or 2-hydroxycapric acid; glycolide, lactide, p-dioxanone, β-propiolactone, β-butyrolactone, δ-valerolactone, or ε-caprolactone, and is more preferably a constituent unit derived from lactic acid or lactide.

The copolymer (A) is particularly limited as long as it is a copolymer having above-explained constituent unit (a-1) and constituent unit (a-2). Among these, it is particularly preferably a malic acid-lactic acid copolymer or a citric acid-lactic acid copolymer.

The mol composition ratio [(a-1)/(a-2)] of constituent unit (a-1) and constituent unit (a-2) in copolymer (A) is preferably 1/10 to 1/50 in an amount supplied for curing, and more preferably 1/10 to 1/20. When the mol composition ratio is in this range, a copolymer which has an excellent effect of promoting degradation speed and which also has excellent compatible to the biodegradable resin (B) is obtained.

In the copolymer (A), another constituent unit (a unit derived from another copolymerization component) except for a multivalent carboxylic acid and a hydroxycarboxylic acid can exist. Provided, however, it is necessary that the amount is in a range in which a character of copolymer (A) does not greatly fall. From the point, the amount is desirable approximately 20 mol % or less in 100 mol % of the constituent unit in entire copolymer (A).

The weight average molecular weight of copolymer (A) is 1,000 to 30,000, and is preferably 2,500 to 20,000. This weight average molecular weight is a value evaluated by gel permeation chromatography (GPC) under the conditions described in the following Examples.

The method for producing the copolymer (A) is not particularly limited. In general, it can be obtained by mixing a multivalent carboxylic acid and a hydroxycarboxylic acid at a desired ratio, and by carrying out dehydration condensation polymerization under heated and reduced pressure in the presence or absence of a catalyst. Also, it can be obtained by reacting an anhydrous cyclic compound of a hydroxycarboxylic acid such as lactide, glycolide, or caprolactone with a multivalent carboxylic acid.

<Biodegradable Resin (B)>

The biodegradable resin (B) used in the present invention is not particularly limited as long as it is a resin having biodegradability. For example, a polyhydroxycarboxylic acid or an aliphatic polyester resin consisting of a diol and a dicarboxylic acid can be used.

In the present invention, the polyhydroxycarboxylic acid means a polymer or copolymer which has a repeating unit (constituent unit) derived from a hydroxycarboxylic acid having both a hydroxyl group and a carboxyl group.

Specific examples of the hydroxycarboxylic acid include lactic acid, glycolic acid, 3-hydroxybutyric acid, 4-hydroxybutyric acid, 2-hydroxy-n-butyric acid, 2-hydroxy-3,3-dimethylbutyric acid, 2-hydroxy-3-methylbutyric acid, 2-methyllactic acid, 2-hydroxyvaleric acid, 2-hydroxycaproic acid, 2-hydroxylauric acid, 2-hydroxymyristic acid, 2-hydroxypalmitic acid, 2-hydroxystearic acid, malic acid, citric acid, tartaric acid, 2-hydroxy-3-methylbutyric acid, 2-cyclohexyl-2-hydroxyacetic acid, mandelic acid, salicylic acid, and ring-opened products of lactones such as caprolactone. This may be used in combination with two or more kinds.

The polyhydroxycarboxylic acid may have another constituent unit (copolymerization component) except for a hydroxycarboxylic acid as long as the character of biodegradable resin (B) does not fall. However, the amount of the constituent unit derived from hydroxycarboxylic acid is 20 mol % or more in 100 mol % of the total constituent unit of the polyhydroxycarboxylic acid, more preferably 50 mol % or more, and particularly preferably 100%.

Among the polyhydroxycarboxylic acids, from the point of compatibility to the copolymer (A), a polymer or a copolymer in which the hydroxycarboxylic acid is lactic acid is preferable and a polylactic acid (homopolymer) is more preferable. The polylactic acid may be synthesized by using lactic acid as a starting material or may be synthesized by using lactide as a starting material.

In the present invention, the aliphatic polyester resin comprising a diol and a dicarboxylic acid means a polymer or copolymer which has a repeating unit (constituent unit) derived from a diol and a dicarboxylic acid. It may have another constituent unit (copolymerization component) except for the aliphatic polyester consisting of a diol and a dicarboxylic acid as long as the character of biodegradable resin (B) does not fall.

Specific examples of the aliphatic polyester resin comprising a diol and a dicarboxylic acid include polyethylene succinates, polyethylene adipates, polyethylene sebacates, polydiethylene succinates, polydiethylene adipates, polyethylene succinate adipates, polydiethylene sebacates, polybutylene succinates, polybutylene adipates, polybutylene succinate adipates, and polybutylene sebacates.

The molecular weight of biodegradable resin (B) is not particularly limited. In view of ease of mixing it with the copolymer (A), the weight average molecular weight of biodegradable resin (B) is preferably 1,000 to 2,000,000, more preferably 3,000 to 1,000,000, and particularly preferably 5,000 to 500,000. This weight average molecular weight is a value evaluated by gel permeation chromatography (GPC) under the conditions described in the following Examples.

<Biodegradable resin composition (C)>

The biodegradable resin composition (C) of the present invention is obtained by mixing the copolymer (A) and biodegradable resin (B). The mass composition ratio [(A)/(B)] is preferably 1/99 to 20/80, and more preferably 5/95 to 15/85, when the total amount of copolymer (A) and biodegradable resin (B) is 100. The mass composition ratio is preferably in this range because an effect of promoting degradation speed due to the copolymer (A) is realized with keeping the character of biodegradable resin (B). Also, when the amount of copolymer (A) is larger, a resin composition having a larger degradation speed is obtained.

The method for mixing the copolymer (A) with the biodegradable resin (B) is not particularly limited. Preferably, both are melt-kneaded, or they are dissolved in a solvent and are stirred and mixed. Since the compatibility of copolymer (A) and biodegradable resin (B) is excellent, a homogeneous resin composition can easily be obtained.

The biodegradable resin composition (C) of the present invention may contain a polymer except for the copolymer (A) and the biodegradable resin (B) or an additive which can be added to a normal resin in a range in which a character of biodegradable resin (B) does not greatly fall.

The molecular weight of biodegradable resin composition (C) is not particularly limited. In view of the moldability, the weight average molecular weight of biodegradable resin composition (C) is preferably 1,000 to 1,000,000, more preferably 5,000 to 500,000, and particularly preferably 50,000 to 300,000. This weight average molecular weight is a value evaluated by gel permeation chromatography (GPC) under the conditions described in the following Examples.

<Biodegradable Molded Article>

The biodegradable molded article of the present invention is obtained by molding the biodegradable resin composition (C) by normal resin molding processing method. Concretely, this molded article is preferably a film, a food package, a package for sanitary goods, an agriculture and gardening material, a fiber, a nonwoven cloth, or a slow-release medicine.

EXAMPLES

As follows, the present invention is explained in detail by the Examples. Provided, however, the present invention is not limited to these.

The methods for measuring property values and the methods for preparing copolymers which are shown in the Examples are as follows.

<Measurement of Weight Average Molecular Weight (Mw)>

A sample was dissolved in a solvent (concentration: 0.5 mass %), and the weight average molecular weight (Mw) was evaluated by gel permeation chromatography (GPC). The apparatus used was GPC system made by Waters, the column used was LF-G and LF-804 made by SHODEX, and the detector used was RI type and 2414 made by Waters. The solvent used was chloroform, the standard substance used was polystyrenes, and the measurement was carried out at a flow rate of 1.0 ml/minute.

<Measurement of Glass Transition Temperature (Tg) by Differential Scanning Calorimeter (DSC)>

The apparatus used was DSC-60 made by SHIMADZU CORPORATION, and the measurement was carried out using approximately 4 to 5 mg of a sample at a temperature increase rate of 10° C./minute in a temperature range of 20 to 250° C. to evaluate the glass transition temperature (Tg).

<Measurement of Tensile Strength>

A pressed film was punched out into Sanka-dumbbell shape, and the measurement was carried out at 23° C. under a tensile speed condition of 20 mm/min.

Preparation Example 1

Malic Acid-Lactic Acid Copolymer

To a 500 ml size glass reactor having a stirrer and a degassing opening, 13.4 g (0.1 mol) of D,L-malic acid made by Wako Pure Chemical Industries, Ltd., 100.2 g (1.0 mol) of 90% L-lactic acid made by Purac, and 18.5 mg (0.0016 mol) of titanium tetraisopropoxide made by Wako Pure Chemical Industries, Ltd. were supplied. In this case, the mol ratio of the malic acid supplied and the lactic acid supplied is 1:10. The reactor was immersed in an oil bath, and a stirring was carried out at 135° C. under 10 mmHg for 30 hours with flowing nitrogen. The reactor was taken out from the oil bath, and the reaction solution was taken out on a stainless steel bat to be cooled and solidified. The colorless and transparent solid obtained was crushed to obtain 65 g of a powdery polymer. The Mw of the polymer was 3,300.

Preparation Example 2

Malic Acid-Lactic Acid Copolymer

Each component was supplied to a reactor in the same manner as in Preparation Example 1 except that the amount of D,L-malic acid was changed to 6.7 g (0.05 mol), and the reaction was carried out to obtain 62 g of a powdery polymer. In this case, the mol ratio of the malic acid supplied and the lactic acid supplied is 1:20. The Mw of the polymer was 3,900.

Preparation Example 3

Malic Acid-Lactic Acid Copolymer

Each component was supplied to a reactor in the same manner as in Preparation Example 1 except that the amount of D,L-malic acid was changed to 2.68 g (0.02 mol), and the reaction was carried out to obtain 60 g of a powdery polymer. In this case, the mol ratio of the malic acid supplied and the lactic acid supplied is 1:50. The Mw of the polymer was 5,000.

Preparation Example 4

Citric Acid-Lactic Acid Copolymer

Each component was supplied to a reactor in the same manner as in Preparation Example 1 except that 21.0 g (0.1 mol) of citric acid monohydrate made by Wako Pure Chemical Industries, Ltd. instead of D,L-malic acid, and the reaction was carried out (provided, however, the reaction temperature was 160° C.) to obtain 69 g of a powdery polymer. In this case, the mol ratio of the citric acid supplied and the lactic acid supplied is 1:10. The Mw of the polymer was 2,600.

Comparative Preparation Example 1

Aspartic Acid-Lactic Acid Copolymer

To the same glass reactor as that of Example 1, 13.3 g (0.1 mol) of L-aspartic acid made by Wako Pure Chemical Industries, Ltd., 50.1 g (0.5 mol) of 90% L-lactic acid made by Purac, and 18.5 mg (0.0016 mol) of titanium tetraisopropoxide made by Wako Pure Chemical Industries, Ltd. were supplied. In this case, the mol ratio of the aspartic acid supplied and the lactic acid supplied is 1:5. The reactor was immersed in an oil bath, and a stirring was carried out at 160° C. for 30 hours with flowing nitrogen. The powder was gradually disappeared in approximately 30 minutes to 1 hour, and the yellow coloration was observed in the reaction solution. The reactor was taken out from the oil bath, and the reaction solution was taken out on a stainless steel bat to be cooled and solidified. The light brownish yellow and transparent solid obtained was crushed to obtain 32 g of a powdery polymer. The Mw of the polymer was 6,200.

Example 1

To 54 g of a polylactic acid with an Mw of 240,000 (LACEA H-400 made by Mitsui Chemicals, Inc.), 6 g of the malic acid-lactic acid copolymer (mol ratio of malic acid and lactic acid: 1:10) obtained in Preparation Example 1 was added, and a stirring was carried out using LABO PLASTOMILL 20C200 made by Toyo Seiki Seisaku-Sho Ltd. for 10 minutes under the conditions of the temperature of 180° C. and the rotating speed of 50 rpm.

The polylactic acid resin composition obtained was pressed with a heat press machine under the conditions of 2 MPa, 180° C., and 5 minutes to produce a film with a thickness of 150 μm. The Mw of the film was 185,000, the glass transition temperature (Tg) by DSC was 55.4° C., and the tensile strength was 61.1 MPa, and it was a colorless and transparent, flexible, and high strength film. When the YI value was measured using chroma meter CR-300 made by Konica Minolta, Inc., the YI value was 4.0.

The above-mentioned film was immersed in distilled water and was left at 50° C. in a thermostatic oven. The film was taken out every predetermined period and was dried, and the molecular weight was measured. After immersing it, whitening was immediately observed in the film. The Mw retention ratios of the films and the tensile strength retention ratios of the films after immersing it for 1.5 days, 3 days, and 5 days are respectively shown in TABLE 1 and TABLE 2. The tensile strength of the film became 0 when 5 days elapsed.

Also, the above-mentioned film was immersed in distilled water and was kept at 60° C. in a thermostatic oven. The film was taken out every predetermined period and was dried, and the molecular weight was measured. After immersing it, whitening was immediately observed in the film. The Mw retention ratios of the films and the tensile strength retention ratios of the films after immersing it for 14 hours, 19 hours, and 24 hours are respectively shown in TABLE 3 and TABLE 4. The tensile strength of the film became 0 when 19 hours elapsed.

Example 2

A film with a thickness of 150 μm was produced in the same manner as in Example 1 except that 6 g of the citric acid-lactic acid copolymer obtained in Preparation Example 4 was used instead of the malic acid-lactic acid copolymer obtained in Preparation Example 1. The Mw of the film was 178,000, the Tg was 55.0° C., and the tensile strength was 61.2 MPa, and it was a colorless and transparent, flexible, and high strength film. The YI value was 4.0. The degradability of this film was evaluated in the same manner as in Example 1. In both the condition of 50° C. and the condition of 60° C., after immersing it in distilled water, whitening was immediately observed in the film. Also, the tensile strength of the film became 0, when 5 days elapsed in the condition of 50° C., and when 19 hours elapsed in the condition of 60° C. Evaluation results are shown in TABLE 1 to TABLE 4.

Example 3

A film with a thickness of 150 μm was produced in the same manner as in Example 1 except that the amounts of the polylactic acid and the malic acid-lactic acid copolymer obtained in Preparation Example 1 were respectively changed to 59.4 g and 0.6 g. The Mw of the film was 210,000, the Tg was 59.8° C., and the tensile strength was 62.3 MPa, and it was a colorless and transparent, flexible, and high strength film. The YI value was 4.0. The degradability of this film was evaluated in the same manner as in Example 1. Evaluation results are shown in TABLE 1 to TABLE 4.

Example 4

A film with a thickness of 150 μm was produced in the same manner as in Example 1 except that the amounts of the polylactic acid and the malic acid-lactic acid copolymer obtained in Preparation Example 1 were respectively changed to 48 g and 12 g. The Mw of the film was 99,000, the Tg was 50.9° C., and the tensile strength was 59.1 MPa, and it was a colorless and transparent, flexible, and high strength film. The YI value was 4.0. The degradability of this film was evaluated in the same manner as in Example 1. In both the condition of 50° C. and the condition of 60° C., after immersing it in distilled water, whitening was immediately observed in the film. Also, the tensile strength of the film became 0, when 1.5 days elapsed in the condition of 50° C., and when 14 hours elapsed in the condition of 60° C. Evaluation results are shown in TABLE 1 to TABLE 4.

Example 5

A film with a thickness of 150 μm was produced in the same manner as in Example 1 except that 6 g of the citric acid-lactic acid copolymer (mol ratio of malic acid and lactic acid: 1:20) obtained in Preparation Example 2 was used instead of the malic acid-lactic acid copolymer (mol ratio of malic acid and lactic acid: 1:10) obtained in Preparation Example 1. The Mw of the film was 188,000, the Tg was 56.1° C., and the tensile strength was 62.5 MPa, and it was a colorless and transparent, flexible, and high strength film. The YI value was 3.9. The degradability of this film was evaluated in the same manner as in Example 1. In both the condition of 50° C. and the condition of 60° C., after immersing it in distilled water, whitening was immediately observed in the film. Evaluation results are shown in TABLE 1 to TABLE 4.

Example 6

A film with a thickness of 150 μm was produced in the same manner as in Example 1 except that the amount of the polylactic acid was changed to 48 g and that 12 g of the citric acid-lactic acid copolymer (mol ratio of malic acid and lactic acid: 1:50) obtained in Preparation Example 3 was used instead of the malic acid-lactic acid copolymer (mol ratio of malic acid and lactic acid: 1:10) obtained in Preparation Example 1. The Mw of the film was 145,000, the Tg was 51.1° C., and the tensile strength was 60.6 MPa, and it was a colorless and transparent, flexible, and high strength film. The YI value was 4.1. The degradability of this film was evaluated in the same manner as in Example 1. In both the condition of 50° C. and the condition of 60° C., after immersing it in distilled water, whitening was immediately observed in the film. Also, the tensile strength of the film became 0, when 5 days elapsed in the condition of 50° C., and when 19 hours elapsed in the condition of 60° C. Evaluation results are shown in TABLE 1 to TABLE 4.

Example 7

A film with a thickness of 150 μm was produced in the same manner as in Example 1 except that 54 g of a polybutylene succinate adipate with an Mw of 150,000 (Bionolle 3010 made by SHOWA HIGHPOLYMER CO., LTD.) was used instead of the polylactic acid. The Mw of the film was 123,000, and it was a white, flexible, and high strength film. The degradability of the film was evaluated by measuring the Mw retention ratio in the same manner as in Example 1. Evaluation results are shown in TABLE 1 and TABLE 3.

Comparative Example 1

A film with a thickness of 150 μm was produced in the same manner as in Example 1 except that the malic acid-lactic acid copolymer obtained in Preparation Example 1 was not used. The Mw of the film was 231,000, the Tg was 59.8° C., and the tensile strength was 67.0 MPa, and it was a colorless and transparent film. The YI value was 3.9. The degradability of this film was evaluated in the same manner as in Example 1. In both temperature conditions, the appearance of the film was kept colorless and transparent. Evaluation results are shown in TABLE 1 to TABLE 4.

Comparative Example 2

A film with a thickness of 150 μm was produced in the same manner as in Example 1 except that 6 g of the aspartic acid-lactic acid copolymer obtained in Comparative Preparation Example 1 was used instead of the malic acid-lactic acid copolymer obtained in Preparation Example 1. The Mw of the film was 217,000, the Tg was 59.8° C., and the tensile strength was 63.2 MPa, and it was a brownish yellow and transparent film. The YI value was 18.9. The degradability of this film was evaluated in the same manner as in Example 1. Evaluation results are shown in TABLE 1 to TABLE 4.

Comparative Example 3

A film with a thickness of 150 μm was produced in the same manner as in Example 7 except that the malic acid-lactic acid copolymer obtained in Preparation Example 1 was not used. The Mw of the film was 148,000, and it was a white film. The degradability of the film was evaluated by measuring the Mw retention ratio in the same manner as in Example 1. Evaluation results are shown in TABLE 1 and TABLE 3.

Comparative Example 4

A film with a thickness of 150 μm was produced in the same manner as in Example 1 except that the amount of the polylactic acid was changed to 59.4 g and that 0.6 g of an O-acetyl triethyl citrate made by Tokyo Chemical Industry Co., Ltd. was used instead of the malic acid-lactic acid copolymer obtained in Preparation Example 1. The Mw of the film was 232,000, the Tg was 58.2° C., and the tensile strength was 62.3 MPa, and it was a colorless and transparent film. The YI value was 3.9. The degradability of this film was evaluated in the same manner as in Example 1. Evaluation results are shown in TABLE 1 to TABLE 4.

Comparative Example 5

A film with a thickness of 150 μm was produced in the same manner as in Example 1 except that 6 g of an O-acetyl triethyl citrate made by Tokyo Chemical Industry Co., Ltd. was used instead of the malic acid-lactic acid copolymer obtained in Preparation Example 1. The Mw of the film was 229,000, the Tg was 44.1° C., and the tensile strength was 28.5 MPa, and it was a colorless and transparent film. The YI value was 4.0. The degradability of this film was evaluated in the same manner as in Example 1. Evaluation results are shown in TABLE 1 to TABLE 4.

TABLE 1

| Elapsed time | Molecular weight retention ratio in water at 50° C. (%) | | | |
|---|---|---|---|---|
| (day) | 0 | 1.5 | 3 | 5 |
| Ex. 1 | 100 | 67.6 | 51.4 | 36.8 |
| Ex. 2 | 100 | 68.0 | 51.7 | 36.5 |
| Ex. 3 | 100 | 87.1 | 73.7 | 62.8 |
| Ex. 4 | 100 | 55.6 | 38.4 | 25.3 |
| Ex. 5 | 100 | 72.9 | 56.4 | 42.0 |
| Ex. 6 | 100 | 68.5 | 50.5 | 38.1 |
| Ex. 7 | 100 | 52.7 | 37.3 | 27.6 |
| Comp. Ex. 1 | 100 | 93.9 | 88.3 | 78.4 |
| Comp. Ex. 2 | 100 | 78.3 | 71.4 | 64.5 |
| Comp. Ex. 3 | 100 | 98.2 | 96.0 | 90.8 |
| Comp. Ex. 4 | 100 | 95.9 | 90.2 | 80.0 |
| Comp. Ex. 5 | 100 | 92.0 | 86.5 | 76.7 |

TABLE 2

| Elapsed time | Tensile strength retention ratio in water at 50° C. (%) | | | |
|---|---|---|---|---|
| (day) | 0 | 1.5 | 3 | 5 |
| Ex. 1 | 100 | 84.1 | 57.0 | 0.0 |
| Ex. 2 | 100 | 83.8 | 56.2 | 0.0 |
| Ex. 3 | 100 | 96.3 | 92.0 | 85.3 |
| Ex. 4 | 100 | 0.0 | 0.0 | 0.0 |
| Ex. 5 | 100 | 88.3 | 63.8 | 32.0 |
| Ex. 6 | 100 | 82.7 | 55.9 | 0.0 |
| Comp. Ex. 1 | 100 | 101.5 | 99.9 | 100 |
| Comp. Ex. 2 | 100 | 95.6 | 78.5 | 46.2 |
| Comp. Ex. 4 | 100 | 100.3 | 99.7 | 100.2 |
| Comp. Ex. 5 | 100 | 99.8 | 100.6 | 98.7 |

TABLE 3

| Elapsed time | Molecular weight retention ratio in water at 60° C. (%) | | | |
|---|---|---|---|---|
| (hour) | 0 | 14 | 19 | 24 |
| Ex. 1 | 100 | 55.4 | 49.2 | 44.6 |
| Ex. 2 | 100 | 56.7 | 50.4 | 45.5 |
| Ex. 3 | 100 | 86.1 | 72.3 | 61.4 |
| Ex. 4 | 100 | 52.5 | 36.4 | 23.2 |
| Ex. 5 | 100 | 67.0 | 54.8 | 49.0 |
| Ex. 6 | 100 | 60.9 | 50.5 | 45.0 |
| Ex. 7 | 100 | 51.1 | 36.0 | 25.2 |

TABLE 3-continued

| Elapsed time | Molecular weight retention ratio in water at 60° C. (%) | | | |
|---|---|---|---|---|
| (hour) | 0 | 14 | 19 | 24 |
| Comp. Ex. 1 | 100 | 93.1 | 91.8 | 89.2 |
| Comp. Ex. 2 | 100 | 76.5 | 74.2 | 68.0 |
| Comp. Ex. 3 | 100 | 94.9 | 92.9 | 88.1 |
| Comp. Ex. 4 | 100 | 95.1 | 93.7 | 91.1 |
| Comp. Ex. 5 | 100 | 91.1 | 89.9 | 87.3 |

TABLE 4

| Elapsed time | Tensile strength retention ratio in water at 60° C. (%) | | | |
|---|---|---|---|---|
| (hour) | 0 | 14 | 19 | 24 |
| Ex. 1 | 100 | 69.1 | 0.0 | 0.0 |
| Ex. 2 | 100 | 72.4 | 0.0 | 0.0 |
| Ex. 3 | 100 | 95.3 | 88.8 | 80.6 |
| Ex. 4 | 100 | 0.0 | 0.0 | 0.0 |
| Ex. 5 | 100 | 84.3 | 61.1 | 40.2 |
| Ex. 6 | 100 | 66.0 | 0.0 | 0.0 |
| Comp. Ex. 1 | 100 | 102.5 | 101.5 | 98.7 |
| Comp. Ex. 2 | 100 | 88.8 | 86.7 | 86.4 |
| Comp. Ex. 3 | 100 | 101.3 | 101.2 | 99.9 |
| Comp. Ex. 5 | 100 | 99.5 | 100.5 | 100.1 |

As shown in TABLES 1 to 4, the films of Examples 1 to 6 in which the copolymer (A) was compounded with a polylactic acid had more excellent degradability than that of the film in Comparative Example 1 in which nothing was compounded with a polylactic acid or that of the film in Comparative Example 4 or 5 in which an O-acetyl triethyl citrate was compound with a polylactic acid.

The films of Examples 1, 2, and 5 in which 6 g of copolymer (A) was compounded with a polylactic acid had more excellent degradability than that of the film in Comparative Example 2 in which 6 g of aspartic acid-lactic acid copolymer was compounded with a polylactic acid. Also, as previously described, the film of Comparative Example 2 was colored brownish yellow while the films of Examples 1 to 6 were colorless and transparent.

Since the copolymer (A) was compounded with a polybutylene succinate adipate in Example 7, it had more excellent degradability than that in Comparative Example 3 in which nothing was compounded with a polybutylene succinate adipate.

Example 8

The transmittance of a light with a wavelength of 200 to 800 nm in the film obtained in Example 1 was measured in every 1 nm using UV-3100PC made by SHIMADZU CORPORATION. The result is shown in FIG. 1.

Comparative Example 6

The transmittance of a light with a wavelength of 200 to 800 nm in the film obtained in Comparative Example 2 was measured in every 1 nm in the same manner as in Example 8. The result is shown in FIG. 1.

As shown in FIG. 1, Example 8 [the film of Example 1 in which 6 g of copolymer (A) was compounded with a polylactic acid] showed more excellent transmittance of a light with a wavelength of 200 to 800 nm than Comparative Example 6 [the film of Comparative Example 2 in which 6 g of an aspartic acid-lactic acid copolymer was compounded with a polylactic acid].

Example 9

The film obtained in Example 1 was left in 23±2° C. and 50±5% RH environment.

The Mw retention ratios and the tensile strength retention ratios after leaving it for 14 days, 23 days, 52 days, 107 days, 253 days, and 368 days are respectively shown in TABLE 5 and TABLE 6.

Comparative Example 7

The preservation stability of the film of Comparative Example 1 was evaluated in the same manner as in Example 9. The evaluation results are shown in TABLE 5 and TABLE 6.

TABLE 5

| | Molecular weight retention ratio at 23° C. and 50% RH (%) Elapsed time (day) | | | | | | |
|---|---|---|---|---|---|---|---|
| | 0 | 14 | 23 | 52 | 107 | 253 | 368 |
| Ex. 9 | 100 | 99.0 | 97.3 | 91.9 | 82.2 | 77.3 | 73.2 |
| Comp. Ex. 7 | 100 | 99.8 | 99.7 | 97.1 | 94.2 | 91.3 | 89.0 |

TABLE 6

| | Tensile strength retention ratio at 23° C. and 50% RH (%) Elapsed time (day) | | | | | | |
|---|---|---|---|---|---|---|---|
| | 0 | 14 | 23 | 52 | 107 | 253 | 368 |
| Ex. 9 | 100 | — | 100.0 | — | 99.8 | 99.8 | 99.8 |
| Comp. Ex. 7 | 100 | — | 100.0 | — | 100.0 | 99.9 | 99.7 |

As shown in TABLE 5 and TABLE 6, Example 9 [the film of Example 1 in which the copolymer (A) was compounded with a polylactic acid] showed approximately equal preservation stability in a normal preservation environment (23° C. and 50% RH) to Comparative Example 7 [the film of Comparative Example 1 in which nothing was compounded with a polylactic acid], and particularly the tensile strength was not decreased little.

INDUSTRIAL APPLICABILITY

The biodegradable resin composition and the molded article of the same of the present invention can preferably be used for the purposes which require excellent degradability and high transparency, which as films, food packages, packages for sanitary goods, agriculture and gardening materials, fibers, nonwoven cloths, and slow-release medicines.

The invention claimed is:
1. A biodegradable resin composition, comprising:
a copolymer (A) with a weight average molecular weight of 2,500 to 20,000, which comprises a constituent unit (a-1) derived from a hydroxydicarboxylic acid and a hydroxytricarboxylic acid and a constituent unit (a-2) derived from a hydroxycarboxylic acid or a hydroxy carboxylic acid derivative selected from glycolic acid, lactic acid, 2-hydroxybutyric acid, 2-hydroxyvaleric acid, 2-hydroxycaproic acid, 2-hydroxycapric acid, glycolide, lactide, p-dioxanone, β-propiolactone, β-butyrolactone, δ-valerolactone or ε-caprolactone, and
a biodegradable resin (B) that is different from the copolymer (A), wherein the copolymer is obtained by mixing the hydroxydicarboxylic acid and the hydroxytricarboxylic acid and the hydroxycarboxylic acid or hydroxycarboxylic acid derivative and by carrying out dehydration condensation polymerization under heat and reduced pressure in the presence or absence of a catalyst, and wherein the mol composition ratio [(a-1)/(a-2)] of constituent unit (a-1) and constituent unit (a-2) in copolymer (A) is 1/10 to 1/50, and wherein a constituent unit other than the constituent units (a-1) and (a-2) in the copolymer (A) is 20 mol % or less, and wherein the biodegradable resin composition has a weight average molecular weight of 50,000 to 1,000,000.

2. The biodegradable resin composition according to claim 1, wherein the constituent unit (a-1) is a constituent unit derived from malic acid and citric acid.

3. The biodegradable resin composition according to claim 1, wherein the biodegradable resin (B) is a polyhydroxycarboxylic acid.

4. The biodegradable resin composition according to claim 1, wherein the biodegradable resin (B) is a polylactic acid.

5. The biodegradable resin composition according to claim 1, wherein the mass composition ratio [(A)/(B)] of copolymer (A) and biodegradable resin (B) is 1/99 to 20/80 when the total amount of copolymer (A) and biodegradable resin (B) is 100.

6. A biodegradable molded article, composed of the biodegradable resin composition according to claim 1.

7. A film, composed of the biodegradable resin composition according to claim 1.

8. The biodegradable resin composition according to claim 1, wherein the copolymer (A) is a malic acid-lactic acid copolymer or a citric acid-lactic acid copolymer.

* * * * *